(12) United States Patent
Smith

(10) Patent No.: US 11,747,588 B2
(45) Date of Patent: Sep. 5, 2023

(54) FLEXURE DEVICE

(71) Applicant: TEXAS INSTRUMENTS INCORPORATED, Dallas, TX (US)

(72) Inventor: Steven Edward Smith, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 344 days.

(21) Appl. No.: 17/077,548

(22) Filed: Oct. 22, 2020

(65) Prior Publication Data

US 2021/0255420 A1    Aug. 19, 2021

Related U.S. Application Data

(60) Provisional application No. 62/976,454, filed on Feb. 14, 2020.

(51) Int. Cl.
| | |
|---|---|
| *G02B 7/00* | (2021.01) |
| *B23Q 16/00* | (2006.01) |
| *G02B 7/182* | (2021.01) |
| *G03B 21/20* | (2006.01) |
| *G03B 21/14* | (2006.01) |

(52) U.S. Cl.
CPC ............. *G02B 7/182* (2013.01); *G02B 7/003* (2013.01); *G03B 21/142* (2013.01); *G03B 21/2066* (2013.01)

(58) Field of Classification Search
CPC ...... G02B 7/002; G02B 7/023; G02B 7/1805; G02B 7/1825; G02B 7/003; G02B 7/004; B23Q 16/008; B23Q 16/00; G01Q 10/04; B82Y 35/00; G03B 21/145; G03B 21/142; G02F 1/133308
See application file for complete search history.

(56) References Cited

U.S. PATENT DOCUMENTS

| | | | |
|---|---|---|---|
| 5,187,876 A * | 2/1993 | Hatheway | ................ B23Q 1/36 33/613 |
| 6,476,986 B2 | 11/2002 | Smith et al. | |
| 2006/0156567 A1* | 7/2006 | Lee | ........................ B82Y 35/00 33/568 |

* cited by examiner

*Primary Examiner* — Ryan D Howard
(74) *Attorney, Agent, or Firm* — Michelle F. Murray; Frank D. Cimino

(57) ABSTRACT

Described examples include a device having a body. The device also has a first flexure on a first surface of the body, the first flexure having a first modulus of elasticity. The device has a second flexure on a second surface of the body, the second surface of the body opposite to the first surface of the body, and the second flexure having a second modulus of elasticity. The device also has a fixed member on a surface of the second flexure opposite to the first flexure. The device also has an adjustment device on a surface of the first flexure opposite to the second flexure.

20 Claims, 9 Drawing Sheets

US 11,747,588 B2

FLEXURE DEVICE

CROSS-REFERENCE TO RELATED APPLICATIONS

This application claims the benefit under 35 U.S.C. § 119(e) to co-owned U.S. Provisional Patent Application Ser. No. 62/976,454, filed Feb. 14, 2020, entitled "FLEXURE SOCKET FOR DEVICE POSITIONING," which is hereby incorporated herein by reference in its entirety.

TECHNICAL FIELD

This relates generally to alignment of devices, and in more particular examples to a flexure device.

BACKGROUND

Spatial light modulators (SLMs), such as digital micromirror devices (DMDs) or liquid crystal on silicon (LCoS) devices, are devices with an array of modulatable pixels. In some SLM based systems, separate SLMs modulate different colors to provide a full color image. The modulated light from each SLM is combined using systems of mirrors, prisms, and lenses to provide a complete image. The SLMs in these systems are aligned to within ½ pixel or less with each other to produce an accurate image.

SUMMARY

In accordance with an example, a device includes a body. The device also includes a first flexure on a first surface of the body, the first flexure having a first modulus of elasticity. The device includes a second flexure on a second surface of the body, the second surface of the body opposite to the first surface of the body, and the second flexure having a second modulus of elasticity. The device also includes a fixed member on a surface of the second flexure opposite to the first flexure. The device also includes an adjustment device on a surface of the first flexure opposite to the second flexure.

In accordance with an example, a projector includes a prism, a fixed plate mounted on the prism, an adjustable plate, and a spatial light modulator mounted on the adjustable plate. The projector also includes a first flexure on a first surface of the adjustable plate, the first flexure having a first modulus of elasticity and a second flexure on a second surface of the adjustable plate, the second surface of the adjustable plate opposite to the first surface of the adjustable plate, and the second flexure having a second modulus of elasticity. Additionally, the projector includes a fixed member in the fixed plate, the fixed member configured to impinge a surface of the second flexure opposite to the first flexure, and an adjustment device in the fixed plate, the adjustment device configured to impinge a surface of the first flexure opposite to the second flexure.

In accordance with an example, a method includes mounting a fixed plate to an optical element, the fixed plate having a first lip on a first side and a second lip on a second side opposite to the first side. The method also includes mounting an optical device on an adjustable plate, the adjustable plate having a first flexure having a first modulus of elasticity on a first side of the adjustable plate and having a second flexure on a second side opposite the first side of the adjustable plate, where the second flexure has a second modulus of elasticity and the second flexure impinges the second lip of the fixed plate. Additionally, the method includes mounting an adjustment mechanism between the first lip of the fixed plate and the first flexure, and positioning the optical device using the adjustment mechanism such that the adjustable plate moves less than the adjustment mechanism.

DETAILED DESCRIPTION

Figure 1:
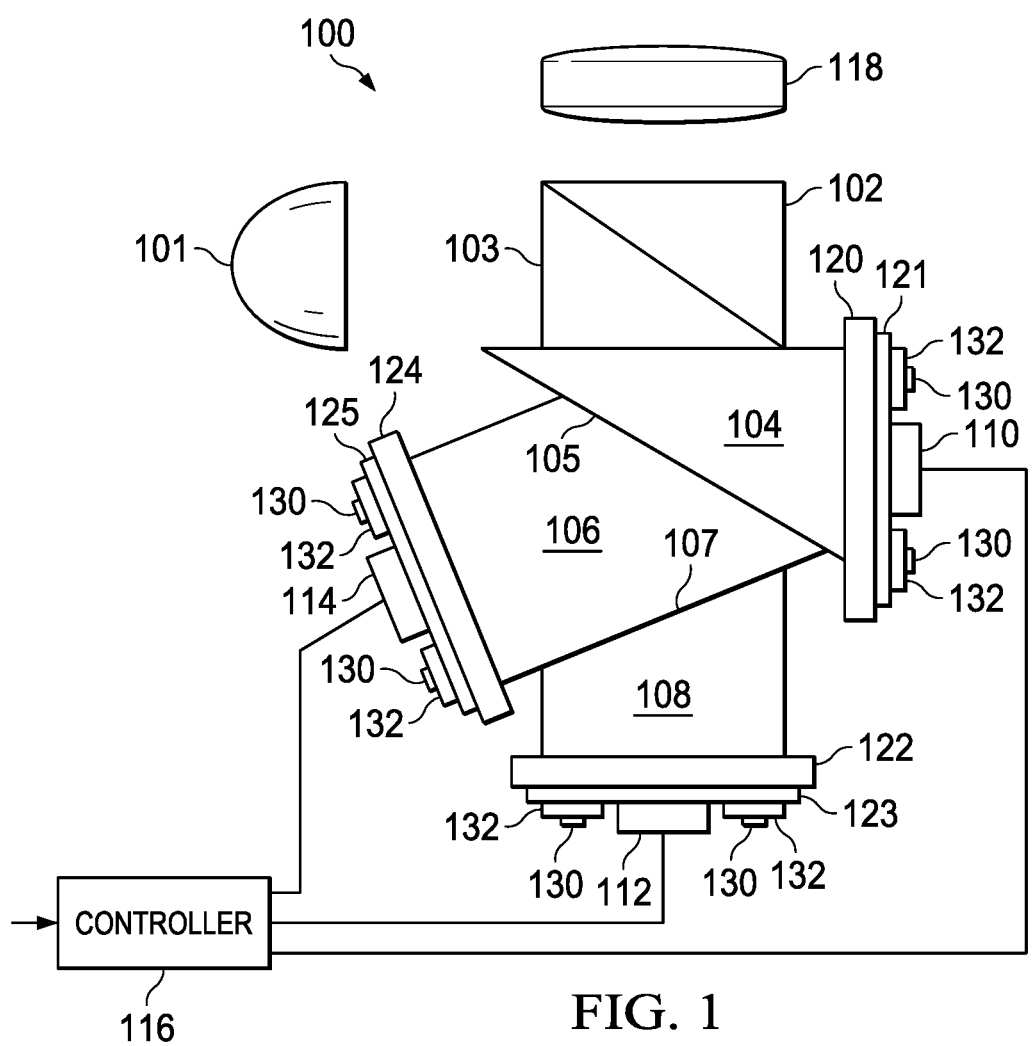
FIG. 1 is a schematic view of an example three-chip projector.

In the drawings, corresponding numerals and symbols generally refer to corresponding parts unless otherwise indicated. The drawings are not necessarily drawn to scale.

In this description, the term "coupled" may include connections made with intervening elements, and additional elements and various connections may exist between any elements that are "coupled." Also, as used herein, the terms "on" and "over" may include layers or other elements where intervening or additional elements are between an element and the element that it is "on" or "over." Elements referred to herein as "optically coupled" are elements that include a connection between the elements that involves transmission of light. Also, as used herein, the term "impinge" means to have an effect or apply force. Intervening elements may be between the impinging element and the element that it impinges. As used herein, the terms "vertical" and "horizontal" refer to the relative positioning within the described device and do not refer to any other frame of reference.

In some systems using spatial light modulators (SLMs), each SLM mounts in a socket. In an example, each socket attaches to a prism using ultraviolet (UV) curable adhesives. Some alignment processes require micron level adjustments after attachment of the SLM socket to the prism with the UV adhesive. The UV curing process shrinks the adhesive, causing the SLM socket to move by up to 15 μm. Socket designs use a combination of screws and springs to readjust the SLM after curing. The screw thread pitch is 0.4 to 0.5 mm. This means that there is 400-500 μm of travel per screw rotation. This makes micron level adjustment difficult, because it is difficult to accurately turn an alignment screw a fraction of a degree of rotation. This becomes more relevant with smaller pixel sizes, for example with a 5 μm pitch.

FIG. 1 is a schematic view of an example projector 100 using three SLM attachments to attach three SLMs to their respective prisms. In FIG. 1, a light source 101 provides a white light beam to a total internal reflection (TIR) prism assembly that includes first prism 102 and second prism 103. The TIR prisms reflect the white light beam to a color splitting prism assembly shown as three prisms, third prism 104, fourth prism 106, and fifth prism 108. As the white light beam passes through the color splitting prism assembly, dichroic filters on the faces of the prisms separate the light beam into three primary color light beams. A first color reflects off a first dichroic mirror 105 at the interface between third prism 104 and fourth prism 106 to first SLM 110. A second color transmits through first dichroic mirror 105 and reflects off second dichroic mirror 107 at the interface of fourth prism 106 and fifth prism 108 to second SLM 112. The remaining color passes through first dichroic mirror 105 and second dichroic mirror 107 to third SLM 114. Thus, first SLM 110, second SLM 112 and third SLM 114 optically couple to the light source 101. First SLM 110, second SLM 112 and third SLM 114 receive electrical signals from a controller 116 that cause each SLM to selectively reflect portions of the primary color light beams at each pixel of each SLM.

The modulated light from first SLM 110 reflects off the first dichroic mirror 105 at the interface between third prism 104 and fourth prism 106. Because of the angle of the modulated light that reflects off first dichroic mirror 105, the light passes through second prism 103 and first prism 102 and through lens 118 for projection. Similarly, the reflected light from second SLM 112 reflects off second dichroic mirror 107 between fourth prism 106 and fifth prism 108 to pass through fourth prism 106, third prism 104, second prism 103, first prism 102, and lens 118 for projection. The modulated light from third SLM 114 passes through fifth prism 108, fourth prism 106, third prism 104, second prism 103, first prism 102, and through lens 118 for projection. Thus, the modulated light from first SLM 110, second SLM 112 and third SLM 114 combines into one, projected image.

In example projector 100, first SLM 110, second SLM 112 and third SLM 114 must be positioned so that each respective pixel of the SLMs aligns to corresponding pixels in the other SLMs in order to display the desired color and intensity of the combined pixel, and thus provide the desired image. To achieve this alignment, first attachment plate 120 mounts to third prism 104 using an adhesive, for example. First SLM 110 mounts to first socket plate 121, which adjustably mounts to first attachment plate 120 using an adhesive applied to posts 130 and washers 132. The adjustment of first socket plate 121 relative to first attachment plate 120 is further explained below with regard to FIG. 2. Similarly, second attachment plate 122 attaches to fourth prism 106 and second socket plate 123 adjustably mounts to second attachment plate 122 using an adhesive applied to posts 130 and washers 132. Also, similarly to first attachment plate 120 and first socket plate 121, third attachment plate 124 attaches to fifth prism 108 and third socket plate 125 adjustably mounts to third attachment plate 124 using an adhesive applied to posts 130 and washers 132.

Figure 2:
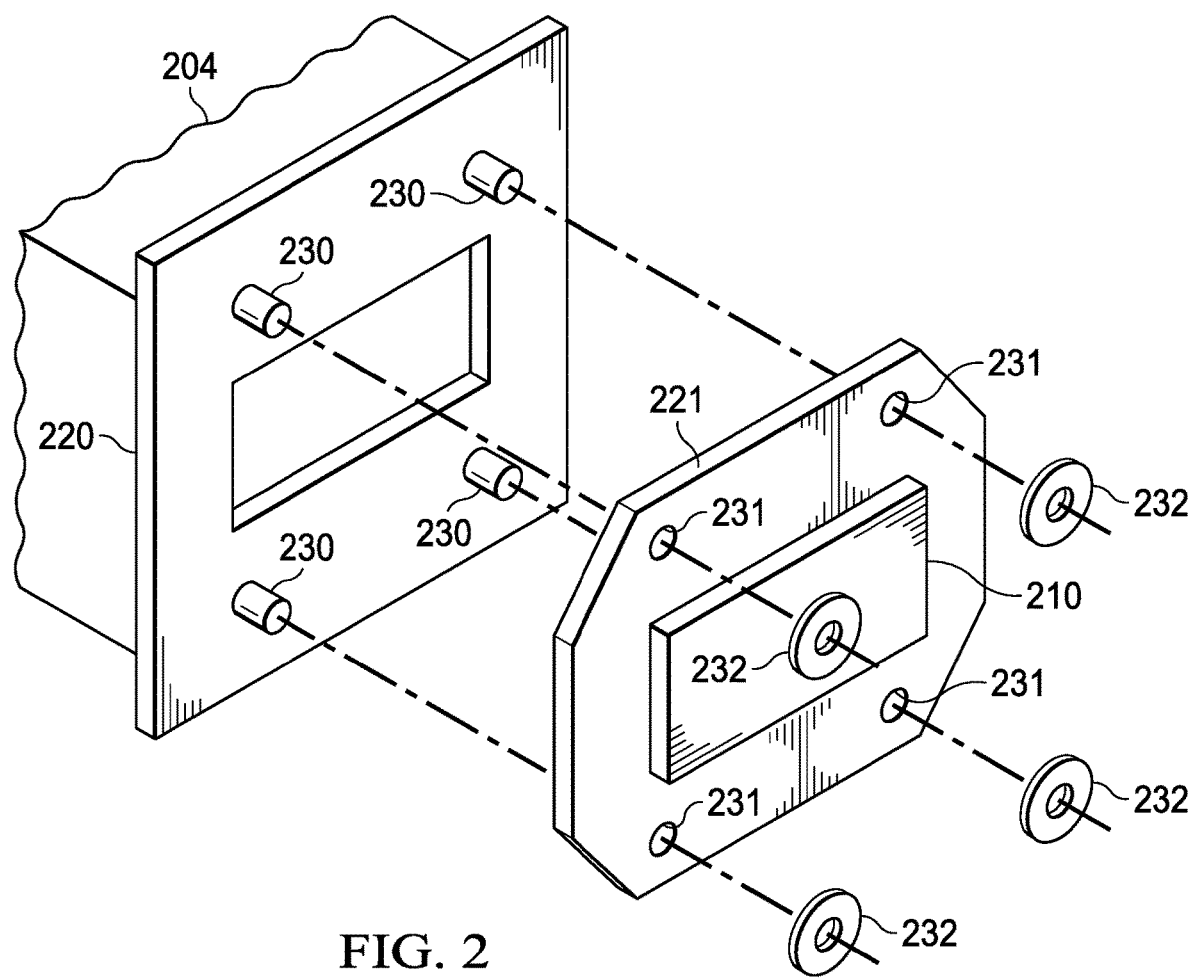
FIG. 2 is an exploded view of an example mounting plate and socket plate combination.

FIG. 2 is an exploded view of an example mounting plate and socket plate combination. In FIG. 2, prism 204 is an example of third prism 104 (FIG. 1), SLM 210 is an example of first SLM 110 (FIG. 1), attachment plate 220 is an example of first attachment plate 120 (FIG. 1), and socket plate 221 is an example of first socket plate 121 (FIG. 1). In an example, attachment plate 220 mounts to an optical element such as prism 204 using an adhesive. In an example, adhesive, fasteners (e.g. screws), or a compression fitting mounts SLM 210 to socket plate 221. Socket plate 221 is placed onto attachment plate 220 such that posts 230 insert into holes 231. A high precision jig (not shown) holds socket plate 221 in place while SLM 210 shows a test pattern projected through lens 118 (FIG. 1). Using the test pattern with other test patterns projected by the other SLMs, SLM 210 is aligned with the other SLMs. An adhesive that cures in response to ultra-violet (UV) light is applied to posts 230 and mounting washers 232. In an example, mounting washers 232 use a glass compound or transparent plastic that allows transmission of UV light. With the jig (not shown) holding the socket plate 221 in proper alignment, mounting washers 232 are placed over posts 230 and UV light is used to cure the adhesive. This holds the SLM 210 in the proper position that aligns with the other SLMs.

However, no adhesive is perfectly stable. In this example, when the UV light cures the adhesive, it can shrink, expand, twist, or otherwise change shape in a manner that moves socket plate 221 up to 15 μm. In the example where SLM 210 is a digital micromirror device, the pixels in a digital micromirror device can have a pitch as small as 5 μm. Therefore, the curing of the adhesive can cause a visible misalignment of the projected pixels. It is therefore desirable to include a mechanism for adjusting the position of SLM 210 after mounting socket plate 221.

Figure 3A:
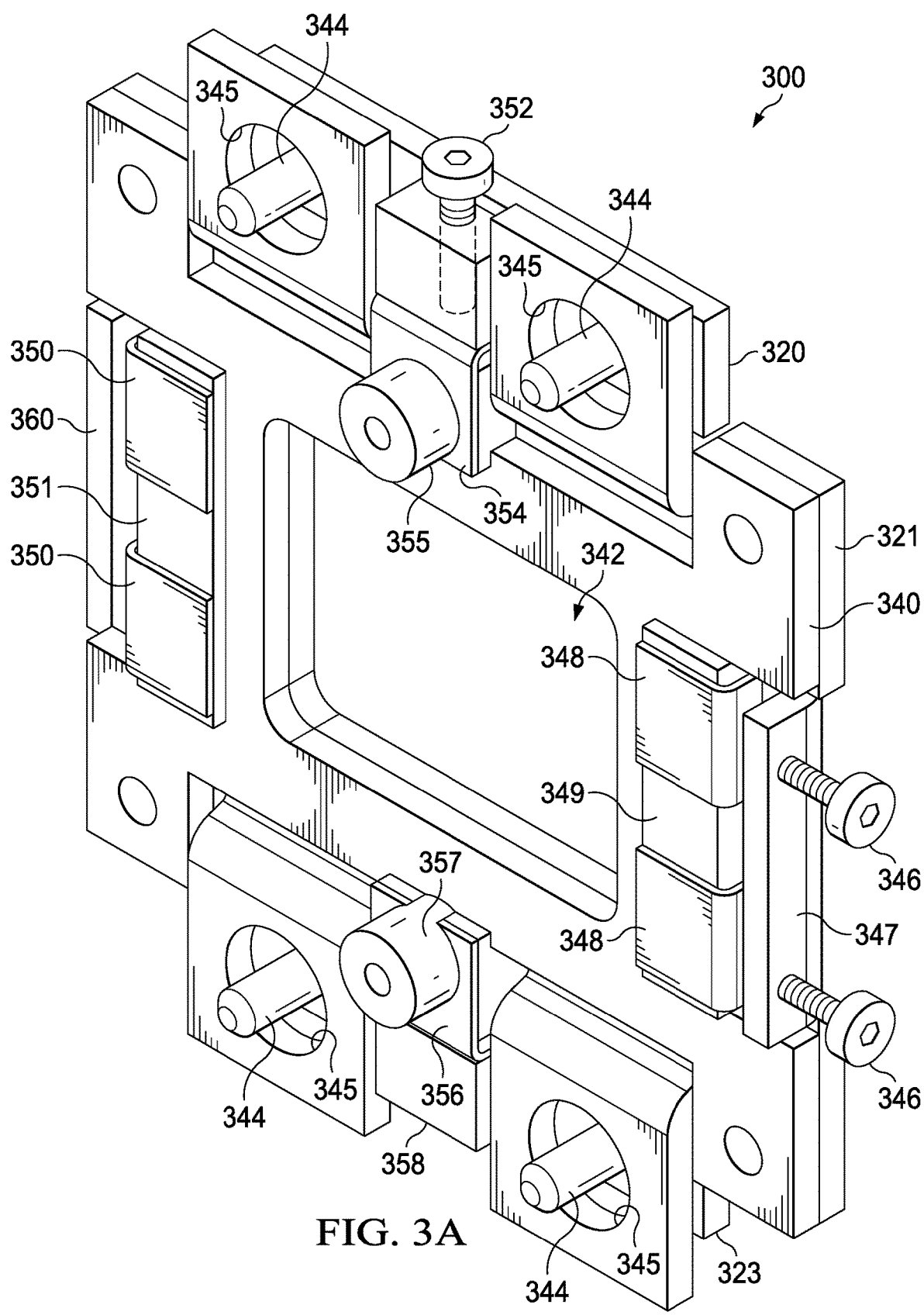
FIGS. 3A-D (collectively "FIG. 3") are a perspective view, an exploded view, a back perspective view, and a partial perspective view with a mounted SLM, respectively, of an example of an alignment device.
Figure 3B:
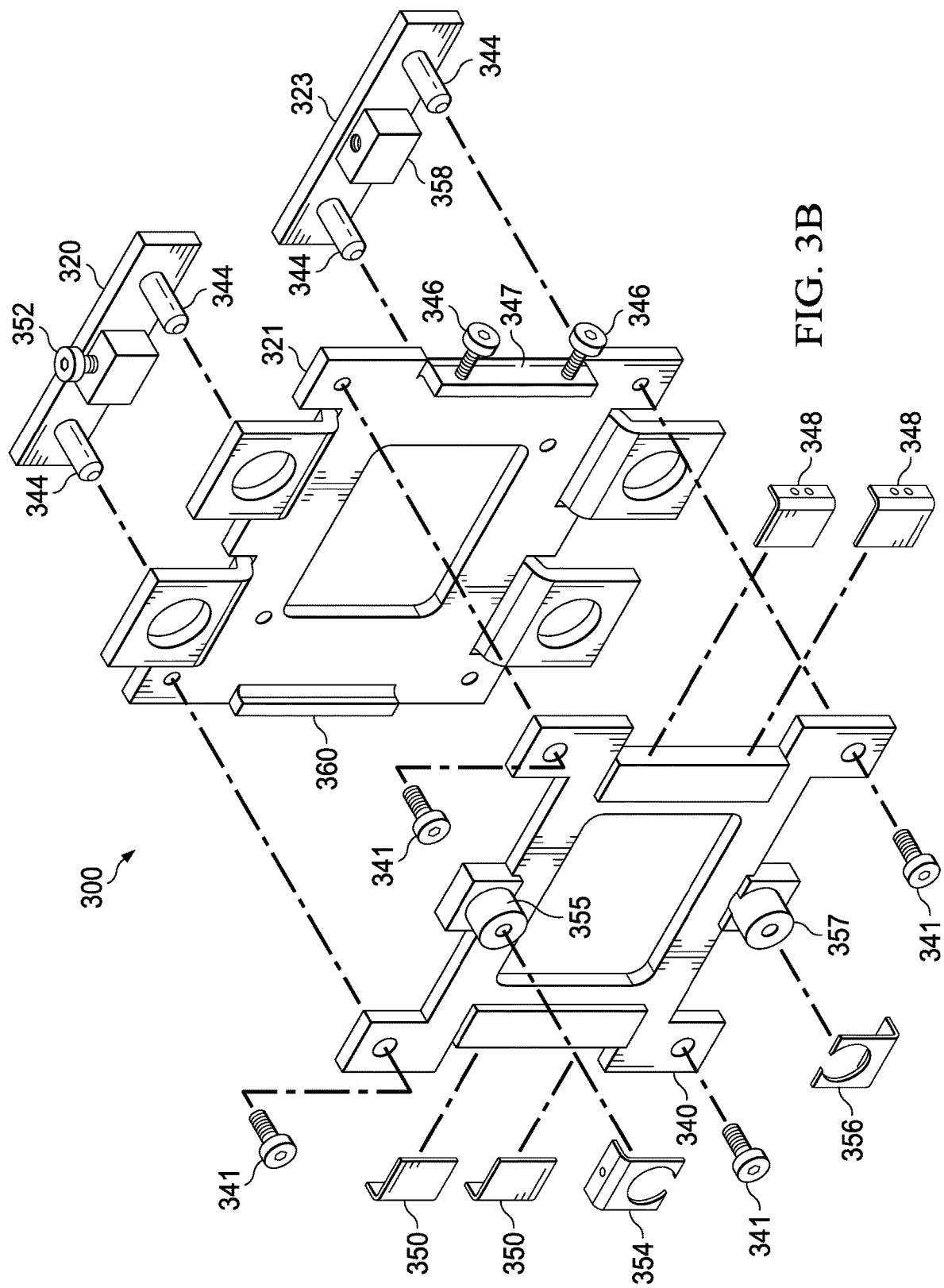
Figure 3C:
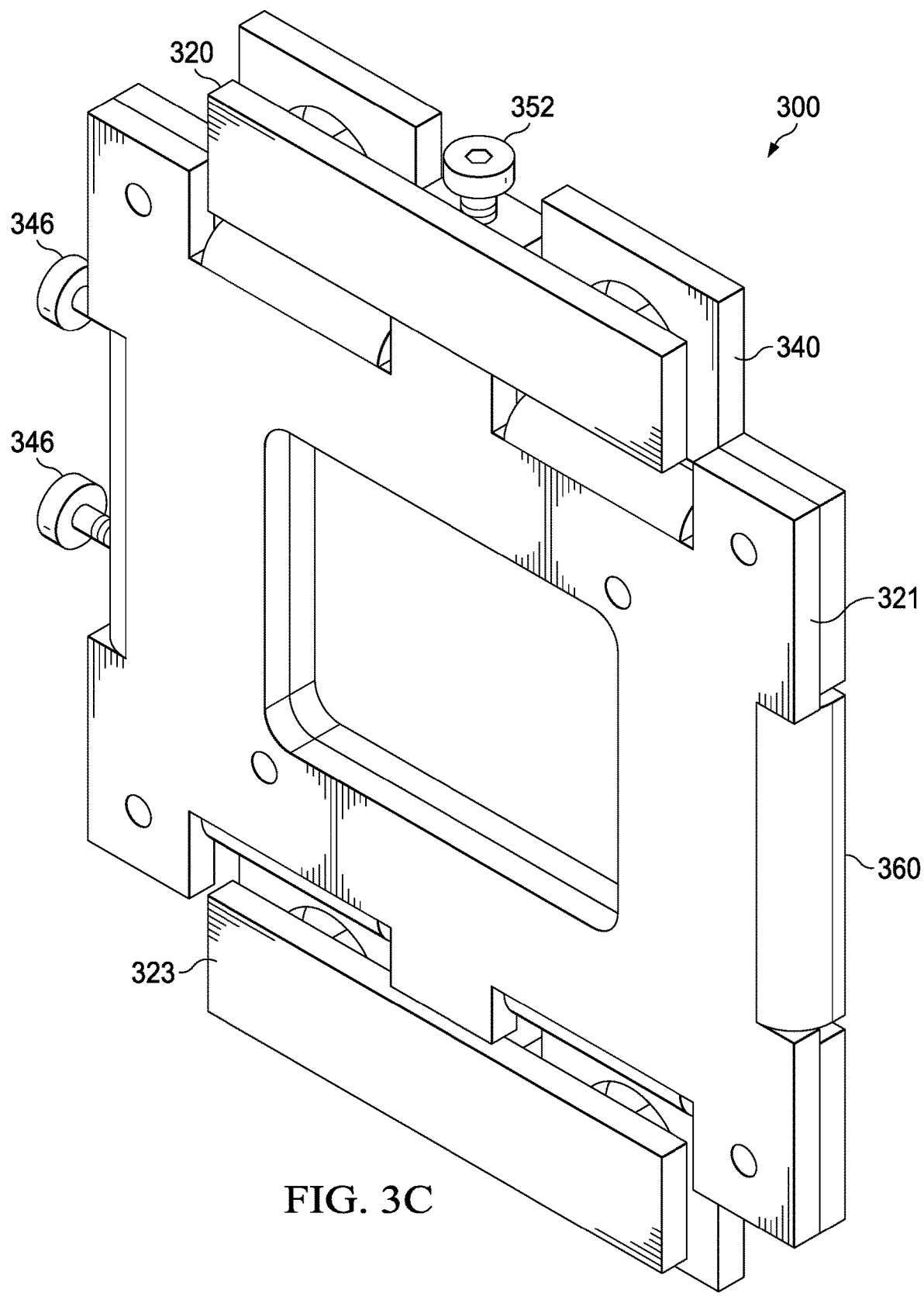
Figure 3D:
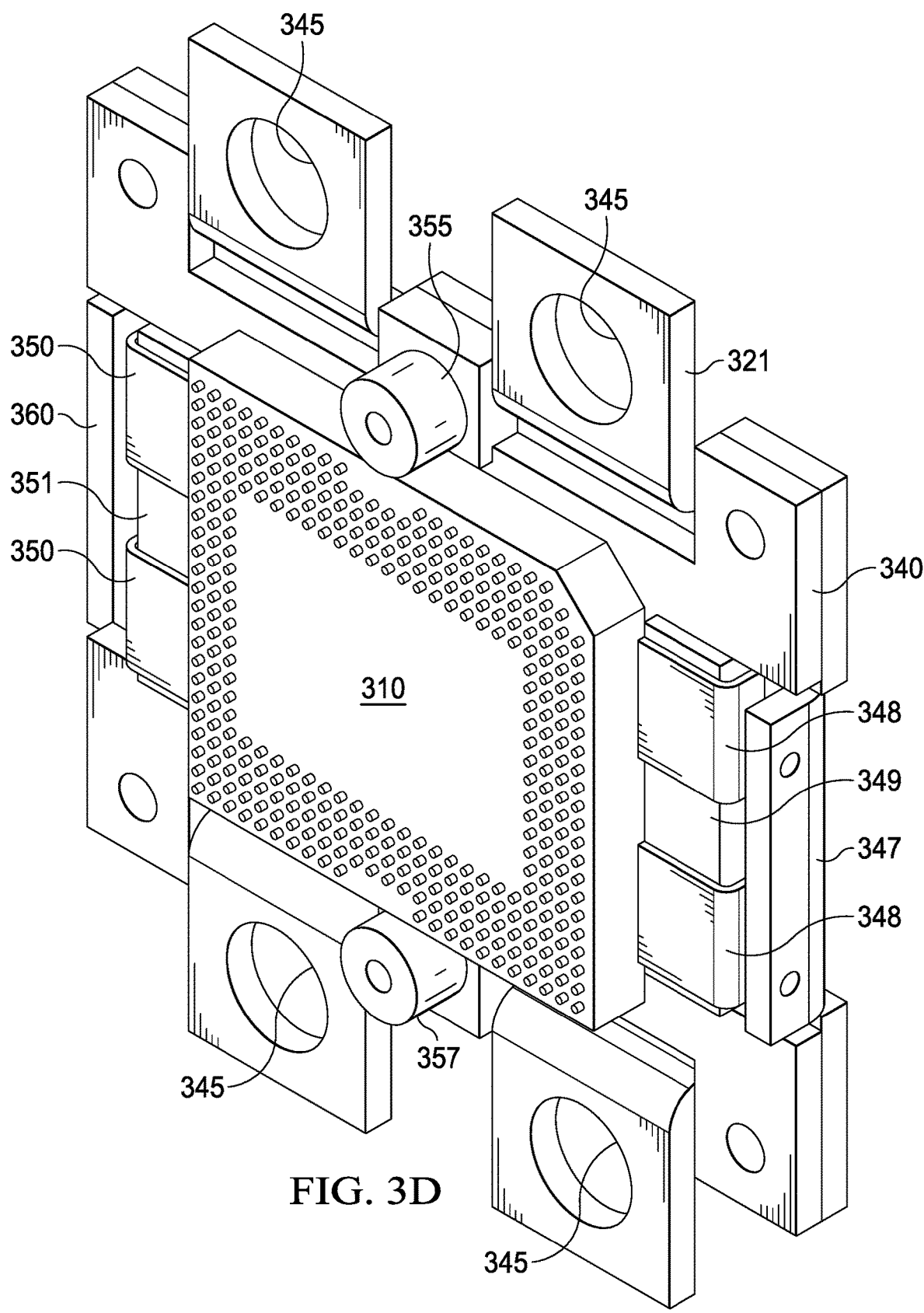

FIGS. 3A-D (collectively "FIG. 3") are a perspective view, an exploded view, a back perspective view, and a partial perspective view with a mounted SLM, and of an example of an alignment device 300 including a fixed plate/adjustable plate combination. FIG. 3A is a perspective view of example alignment device 300. FIG. 3B is an exploded view of the example of FIG. 3A. FIG. 3C is a perspective view of alignment device 300 that depicts a view of an opposite side to the view of FIG. 3A. FIG. 3D is a perspective view of alignment device 300 including SLM 310. The combination of partial attachment plate 320 and partial attachment plate 323 is an example of attachment plate 220 (FIG. 2), and fixed plate 321 is an example of socket plate 221 (FIG. 2). In this example, fixed plate 321 and adjustable plate 340 are stamped steel. In other examples, either fixed plate 321 and/or adjustable plate 340 are other metals, such as aluminum or titanium, or a plastic material. As shown in the example of FIG. 3B, screws 341 hold adjustable plate 340 and fixed plate 321 together. In other examples, other mechanisms, such as posts with cotter pins, are used. Screws 341 allow for some lateral movement between adjustable plate 340 and fixed plate 321. Adjustable plate 340 includes opening 342 (socket) where an example aligned device, such as SLM 310 (FIG. 3D) fixedly mounts. In other examples, adjustable plate 340 and SLM 310 are an integrated combination. In an example, SLM 310 (FIG. 3D) is a spatial light modulator such as a micromirror device, such as a digital micromirror device (DMD), or a liquid crystal-based modulator, such as a liquid crystal on silicon (LCoS) device. In other examples, opening 342 mounts another type of optical device, such as a sensor array. In other examples, opening 342 mounts other types of devices where the ability for very fine positional adjustment is desirable.

In this example, the attachment plate is in two pieces, partial attachment plate 320 and partial attachment plate 323, that each include two posts 344. The posts go through holes 345 in fixed plate 321, and fixed plate 321 mounts to posts 344 using the technique of FIG. 2, for example. In an example, partial attachment plate 320 and partial attachment plate 323 mount to a prism using an adhesive. In an example, partial attachment plate 320 and partial attachment plate 323 attach to prism 204 (FIG. 2). In an example, adhesive, fasteners (e.g. screws), or a compression fitting mounts an SLM, in an example SLM 310 (FIG. 3D), to opening 342. Fixed plate 321 is placed onto partial attachment plate 320 and partial attachment plate 323 such that posts 344 insert into holes 345. A high precision jig (not shown) holds fixed plate 321 in place while SLM 310 (FIG. 3D) shows a test pattern projected through a projection lens such as lens 118 (FIG. 1). Using the test pattern with other test patterns projected by other SLMs, SLM 310 (FIG. 3D) is aligned with the other SLMs. An adhesive that cures in response to ultra-violet (UV) light is applied to posts 344 and mounting washers, in example mounting washers 232 (FIG. 2). In an example, mounting washers 232 (FIG. 2) use a glass compound or transparent plastic that allows transmission of UV light. With the jig (not shown) holding the fixed plate 321 in proper alignment, mounting washers 232 (FIG. 2) are placed over posts 344 and UV light is used to cure the adhesive. This holds the SLM 310 (FIG. 3D) in the proper position that aligns with the other SLMs.

In this example, fixed plate 321 includes a first lip 347. First lip 347 is a portion of fixed plate 321 at a first side that is bent to a position perpendicular to the primary plane of fixed plate 321. First lip 347 includes two threaded holes that provide a fixed threaded member for an adjustment device such as x-axis adjustment screws 346. X-axis adjustment screws 346 impinge upon one end of first flexures 348 at a first surface 349 of the adjustable plate. In an example, first flexures 348 are single leaf springs formed of tempered steel or beryllium copper alloy. In other examples, first flexures 348 are coil springs or other mechanisms. However, the use of leaf springs allows for a more compact structure that is easier and cheaper to manufacture than with some other flexure structures. In the example of FIG. 3, first flexures 348 are composed of the same material and use the same mechanism. However, in other examples, first flexures 348 are composed of different materials and/or use different mechanisms. The portion of first flexures 348 parallel to the face of adjustable plate 340 bonds to adjustable plate 340 using adhesives, fasteners, or welding. The portion of first flexures 348 that impinges x-axis adjustment screws 346, which is perpendicular to the face of adjustable plate 340, is separated from adjustable plate 340 to allow for flexing of first flexures 348, both at the bend between the parallel portion of first flexures 348 and deformation of the perpendicular portion of flexures 348.

Second flexures 350 are on a second surface 351 of adjustable plate 340 that is opposite first surface 349 of adjustable plate 340. As with first flexures 348, the portion of second flexures 350 substantially parallel to the face of adjustable plate 340 bonds to adjustable plate 340. Fixed plate 321 includes a second lip 360 that extends substantially perpendicularly to the primary plane of fixed plate 321 at a second side of fixed plate 321 opposite the first side, which serves as a fixed member. Second flexures 350 impinge second lip 360 at a portion of second flexures 350 that is separated from adjustable plate 340 to allow for flexing of second flexures 350. In an example, second flexures 350 are leaf springs formed of tempered steel or beryllium copper alloy. Other examples of second flexures 350 are coil springs or other spring-type mechanisms.

In this example, second flexures 350 have a modulus of elasticity (stiffness) that is greater than the modulus of elasticity of first flexures 348. This difference in modulus of elasticity is determined by the thickness of the spring, tempering and/or material of the spring, among other factors. When one or both of x-axis adjustment screws 346 are turned, the pressure applied by x-axis adjustment screws 346 between second lip 360 and x-axis adjustment screws 346 equally distributes between first flexures 348 and second flexures 350. Thus, the first flexures 348 and second flexures 350 will compress in proportion to their modulus of elasticity. For example, if the modulus of elasticity (stiffness) of second flexures 350 is 20 times that of first flexures 348, the first flexures 348 will compress 20 times more that second flexures 350.

In an example, a finely threaded screw has a pitch of 0.1 mm (254 threads-per-inch (TPI)). By definition, one turn of a screw with a pitch of 0.1 mm moves the screw 100 µm (0.1 mm). However, the pitch of pixels in a digital micromirror device can be as small as 5 µm. To move 5 µm would require a $1/20^{th}$ of a turn of such a screw, which is very difficult to do accurately. Therefore, directly moving the adjustable plate with a screw does not provide the fine movement for an application such aligning spatial light modulators. However, in the example of FIG. 3, if x-axis adjustment screws 346 are turned one turn, first flexures 348 will compress by approximately 100 µm. Because the force is equal on second flexures 350, and because second flexures 350 are 20 times stiffer than first flexures 348, second flexures 350 will compress $1/20^{th}$ of first flexures 348 or 100/20=approximately 5 µm. The compression of second flexures 350 is between fixed plate 321 and adjustable plate 340, so one turn of the screw makes a 5 µm adjustment to the position of adjustable plate 340. Using quarter or half turns can provide even finer adjustments.

To be more precise, for a given displacement D of x-axis adjustment screws 346, the displacement will be distributed between first flexures 348 and second flexures 350. The displacement D is equal to the sum of the displacement of the flexures. If X is the displacement of flexures 348, then the displacement of flexures 350 is $1/20^{th}$ of X. Mathematically, this is written as:

$$D = d_{F1} + d_{F2} = X + \frac{1}{20}X \tag{1}$$

where $d_{F1}$ is the displacement of the first flexures and $d_{F2}$ is the displacement of the second flexures. For example, if D is 100 µm, then X is equal to 100/1.05 or 95.24 µm, which is equal to $d_{F1}$. The $d_{F2}$ is equal to $1/20^{th}$ of $d_{F1}$ or 4.76 µm. Thus, in this example, turning x-axis adjustment screws 346 by one turn will move adjustable plate 340 by 4.76 µm.

The example of FIG. 3 also includes third flexure 354 and fourth flexure 356. In an example, third flexure 354 and fourth flexure 356 are leaf springs formed of tempered steel or beryllium copper alloy. Other examples of third flexure 354 and fourth flexure 356 are coil springs and other mechanisms. Third flexure 354 mounts around a post 355 in adjustable plate 340. In an example, an adhesive, fastener(s), or welding mounts third flexure 354 to adjustable plate 340. An adjustment device such as y-axis adjustment screw 352 threads through an opening in partial attachment plate 320 and impinges upon third flexure 354. There is a gap between third flexure 354 and adjustable plate 340 where y-axis adjustment screw 352 impinges upon third flexure 354 to allow for flexing of third flexure 354. Fourth flexure 356 mounts around post 357 and impinges upon block 358 of partial attachment plate 323. In an example, an adhesive or welding mounts fourth flexure 356 to adjustable plate 340. In this example, post 355 and post 357 provide a mounting point for a circuit board (not shown) including an SLM 310 (FIG. 3D) to adjustable plate 340. There is a gap between fourth flexure 356 and adjustable plate 340 where fourth flexure 356 impinges block 358 to allow for flexing of fourth flexure 356. As with first flexures 348 and second flexures 350, fourth flexure 356 has a greater modulus of elasticity than third flexure 354. Thus, y-axis adjustment screw 352 is capable of very fine adjustments of the y-axis position of adjustable plate 340 using the same principles as described above regarding x-axis adjustment screws 346. The use of two x-axis adjustment screws 346 and possibly using y-axis adjustment screw 352 allows for rotational adjustment by separately adjusting x-axis adjustment screws 346 and/or y-axis adjustment screw 352. In other examples, two screws with one or more fixed points provide rotational adjustment capability. In the example of FIG. 3, x-axis adjustment screws 346 and y-axis adjustment screw 352 move adjustable plate 340 in orthogonal directions. However, in other examples, adjustment screws and their associated flexures may be positioned in any orientation around adjustable plate 340. In addition, while the example of FIG. 3 includes screws that push the flexures, other examples may pull on the flexures. For example, x-axis adjustment screws 346 may be threaded into flexures 348 and second flexures 350 may be fixed to allow x-axis screws to push or pull the adjustable plate.

Figure 4:
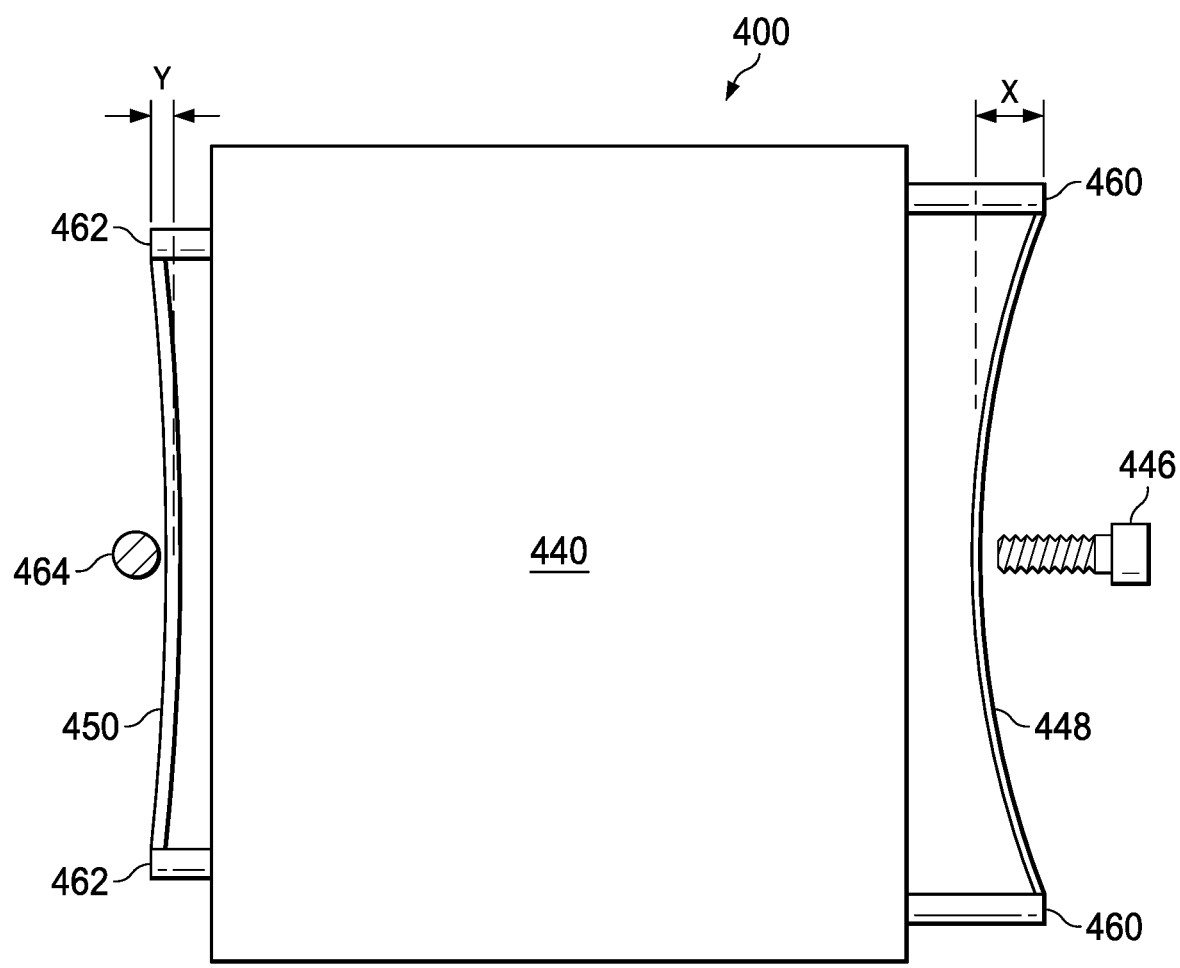
FIG. 4 is a schematic view of an example adjustment device.

FIG. 4 is a schematic view of an example adjustment device 400. In FIG. 4, a body 440, an example of which is adjustable plate 340 (FIG. 3), is between post 464 and an adjustment device 446. In this example, adjustment device 446 is a screw. In other examples other adjustment mechanisms are employed, such as cams and wedges. Adjustment device 446 impinges upon first flexure 448, which mounts between posts 460 on body 440. Post 464 impinges upon second flexure 450, which mounts between posts 462 on body 440. First flexure 448 and second flexure 450 are mounted to posts 460 and 462, respectively, using fasteners, adhesives, welding, or other fastening techniques. As indicated by the relative thickness of first flexure 448 and second flexure 450, second flexure 450 is stiffer than first flexure 448. Because the force of adjustment device 446 is equal but opposite between first flexure 448 and second flexure 450, for a given displacement X of first flexure 448 caused by turning adjustment device 446, a smaller displacement Y of second flexure 450 occurs. Because post 464 is fixed, the displacement Y is the displacement of body 440. As described above, the ratio of displacement Y to displacement X is the inverse of the ratio of the modulus of elasticity (stiffness) of first flexure 448 to that of second flexure 450. Mathematically this is expressed as:

$$\frac{Y}{X} = \frac{ME_1}{ME_2} \qquad (2)$$

where $ME_1$ is the modulus of elasticity of first flexure 448 and $ME_2$ is the modulus of elasticity of second flexure 450. The displacement of the adjustment device is equal to the sum of the displacement of each flexure. This is written mathematically as:

$$D = Y + X \qquad (3)$$

where D is the displacement of the adjustment device, Y is the displacement of second flexure (and thus the adjustable plate), and X is the displacement of the first flexure. Solving Equation 2 for X, substituting for X in Equation 3 and then solving Equation 3 for Y yields:

$$Y = \frac{D}{\left(1 + \frac{ME_2}{ME_1}\right)}. \qquad (4)$$

Therefore, because body 440 moves, the displacement D divided by a factor that ranges from one ($ME_1$ is completely inelastic or $ME_2$ is completely elastic) to infinity ($ME_1$ is completely elastic or $ME_2$ is completely inelastic). Thus, Y is equal to D or a fraction of D, depending on the ratio of $ME_1$ and $ME_2$. In the example where $ME_2$ is twenty times $ME_1$ and D is 100 μm, Y is 100/21 or 4.76 μm.

Figure 5:
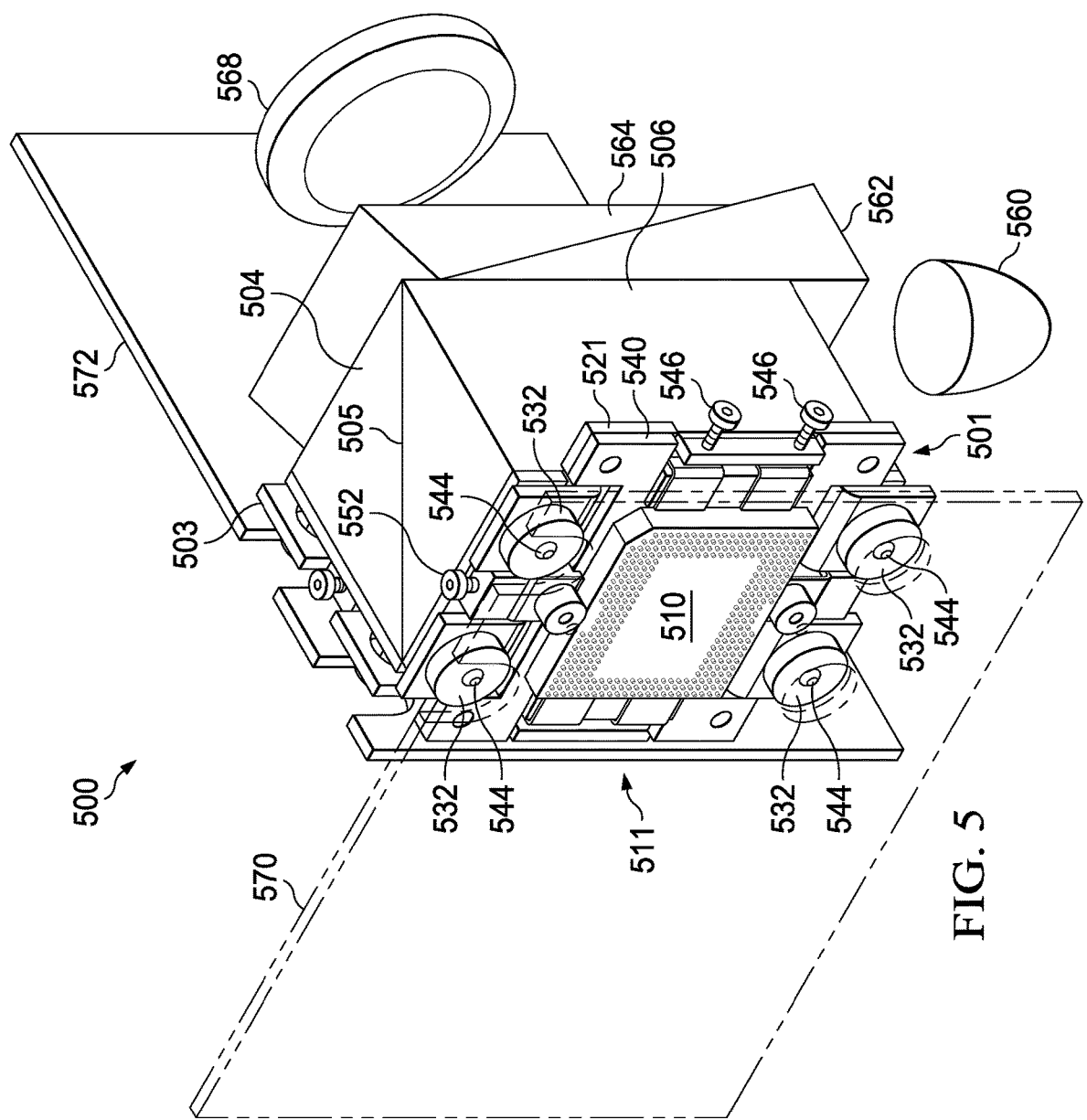
FIG. 5 is a perspective diagram of an example two-chip projector.

FIG. 5 is a perspective diagram of an example two-chip projector 500. SLM 510 is an example of SLM 210 (FIG. 2), mounting washers 532 are examples of mounting washers 232 (FIG. 2), fixed plate 521 is an example of fixed plate 321 (FIG. 3), adjustable plate 540 is an example of adjustable plate 340 (FIG. 3), x-axis adjustment screws 546 are examples of x-axis adjustment screws 346 (FIG. 3), and y-axis adjustment screw 552 is an example of y-axis adjustment screw 352 (FIG. 3). An alignment device 501, which is an example of alignment device 300 (FIG. 3A), mounts to an optical element such as prism 506. Mounting washers 532 are fastened to posts 544 by applying UV curable adhesive as described above with regard to FIG. 2. Posts 544 are part of two partial attachment plates that are examples of partial attachment plates 320 and 323 (FIG. 3). SLM 510 mounts to alignment device 501, which is an example of alignment device 300 (FIG. 3A), which is in turn mounted to circuit board 570. In this example, after curing of the UV curable adhesive that holds mounting washers 532 in place in accordance with the process of FIG. 2, SLM 510 receives a test pattern via circuit board 570. In other examples, alignment device 501 mounts to prism 506 using another mechanism, such as fasteners or adhesives. X-axis adjustment screws 546 and y-axis adjustment screw 552 provide the ability to make fine adjustments to optimize the projected image. A second SLM and alignment device 503 mounted to circuit board 572 mounts to prism 504. The second SLM and alignment device 503 is fixed after mounting and the position of SLM 510 is adjusted to match the position of the second modulator. In another example, the second SLM is mounted to prism 504 in fixed manner, such as a socket plate 221 (FIG. 2). The second SLM 511 is not visible in the perspective of FIG. 5.

In an example, light source 560 alternately provides red, green, and blue light at regular intervals, using a color wheel, a stationary phosphor, separate RGB lasers, a tunable laser, or other mechanism. In another example, light source provides cyan, yellow, and magenta. Prism 562 and prism 564 provide a total internal reflection (TIR) prism structure that directs light from light source 560 toward SLM 510. In this example, dichroic mirror 505 passes green light and reflects red and blue light. Thus, green light is modulated by SLM 510. Modulated light from SLM 510 passes through prism 506, dichroic mirror 505 and prism 504. Because of the angle of the interface between prisms 562 and 564, light from SLM 510 also passes through prism 562 and prism 564 to projection optics 568. In an example using LCoS-based SLMs, a narrower angle on to the SLMs is used because LCoS reflect perpendicularly to the plane of the SLM, whereas DMD-based SLMs reflect at different angles due to the movement of the micromirrors. Although the different colors of light are provided at different times, the cycle through the different colors is faster than the eye can perceive the separate colors and the eye integrates them into the desired shade and intensity for each pixel. As noted above, y-axis adjustment screw 552 and x-axis adjustment screws 546 are used to adjust SLM 510 so its pixels align with the corresponding pixels of the SLM (not shown) coupled to circuit board 572, and thus the desired image is accurately reproduced.

Red and blue light from light source 560 is directed toward the second SLM coupled to circuit board 572 by reflecting off the interface between prism 562 and prism 564, and then reflecting off dichroic mirror 505. Modulated light from the second SLM coupled to circuit board 572 then passes through prism 504, reflects off dichroic mirror 505, through prism 504, through prism 562, and through prism 564 to projection optics 568. In this manner, the red and blue modulated light from the SLM coupled to circuit board 572 and the green modulated light from SLM 510 are combined.

Figure 6:
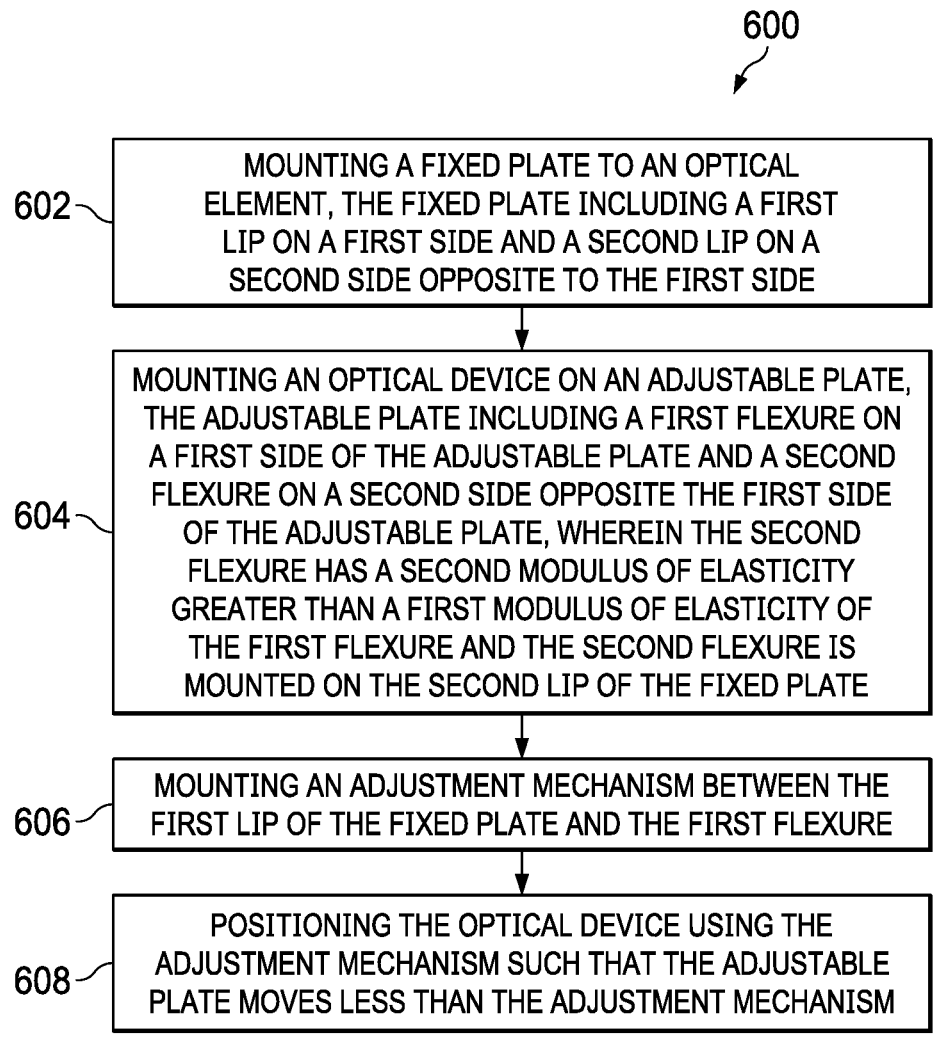
FIG. 6 is a flow diagram of an example method.

FIG. 6 is a flow diagram of an example method 600. Step 602 is mounting a fixed plate to an optical element, the fixed plate including a first lip on a first side and a second lip on a second side opposite to the first side. In an example, mounting the fixed plate to the optical element includes placing the fixed plate on posts mounted to the optical device, applying UV curable adhesive to the posts and to washers, placing the washers on the posts and on the fixed plate, and curing the UV curable adhesive. An example fixed plate is fixed plate 321 (FIG. 3) or fixed plate 521 (FIG. 5). In an example, the fixed plate is placed onto an attachment plate such that posts of the attachment plate are inserted into holes in the fixed plate. An example of the attachment plate is attachment plate 220 (FIG. 2). An adhesive that cures in response to ultra-violet (UV) light is applied to the posts and mounting washers. An example of the mounting washers is mounting washers 232. In an example, the mounting washers use a glass compound or transparent plastic that allows transmission of UV light. UV light is used to cure the adhesive. Step 604 is mounting an optical device on an adjustable plate, the adjustable plate including a first flexure on a first side of the adjustable plate and a second flexure on a second side opposite the first side of the adjustable plate, where the second flexure has a second modulus of elasticity greater a first modulus of elasticity of the first flexure and the second flexure is mounted on the second lip of the fixed plate. In an example, the second modulus of elasticity is twenty times the first modulus of elasticity. An example adjustable plate is adjustable plate 340 (FIG. 3) or adjustable plate 540 (FIG. 5). An example of the optical device is SLM 310 (FIG. 3). An example of the first flexure is first flexures 348 (FIG. 3) and an example of the second flexure is second flexures 350 (FIG. 3). Step 606 is mounting an adjustment mechanism between the first lip of the fixed plate and the first flexure. An example of an adjustment mechanism is x-axis adjustment screws 346 (FIG. 3). Step 608 is positioning the optical device using the adjustment mechanism such that the adjustable plate moves less than the adjustment mechanism.

Modifications are possible in the described examples, and other examples are possible, within the scope of the claims.

What is claimed is:

1. A device comprising:
   a body having a socket;
   a first flexure on a first surface of the body, the first flexure having a first modulus of elasticity;
   a second flexure on a second surface of the body, the second surface of the body opposite to the first surface of the body, and the second flexure having a second modulus of elasticity;
   a fixed member on a surface of the second flexure; and
   an adjustment device on a surface of the first flexure.

2. The device of claim 1, wherein the second modulus of elasticity is greater than the first modulus of elasticity.

3. The device of claim 2, wherein the second modulus of elasticity is twenty times greater than the first modulus of elasticity.

4. The device of claim 1, wherein the adjustment device is a screw in a fixed threaded member and an end of the screw is impinging on the first flexure.

5. The device of claim 1, wherein the socket is adapted to receive an aligned device.

6. The device of claim 5, wherein the aligned device is a spatial light modulator.

7. The device of claim 1, wherein the first flexure is a leaf spring and the second flexure is a leaf spring.

8. The device of claim 1, wherein the first flexure is a coil spring and the second flexure is a coil spring.

9. A projector comprising:
   a prism;
   a fixed plate mounted on the prism;
   an adjustable plate;
   a spatial light modulator mounted on the adjustable plate;
   a first flexure on a first surface of the adjustable plate, the first flexure having a first modulus of elasticity;
   a second flexure on a second surface of the adjustable plate, the second surface of the adjustable plate opposite to the first surface of the adjustable plate, and the second flexure having a second modulus of elasticity;
   a fixed member in the fixed plate, the fixed member configured to impinge a surface of the second flexure opposite to the first flexure; and
   an adjustment device in the fixed plate, the adjustment device configured to impinge a surface of the first flexure opposite to the second flexure.

10. The projector of claim 9, wherein the second modulus of elasticity is greater than the first modulus of elasticity.

11. The projector of claim 10, wherein the second modulus of elasticity is twenty times greater than the first modulus of elasticity.

12. The projector of claim 9, wherein the adjustment device is a screw in the fixed plate and the screw impinges on the first flexure.

13. The projector of claim 9, wherein the first flexure is a leaf spring and the second flexure is a leaf spring.

14. The projector of claim 9, wherein the first flexure is a coil spring and the second flexure is a coil spring.

15. A method comprising:
   mounting a fixed plate to an optical element, the fixed plate having a first lip on a first side and a second lip on a second side opposite to the first side;
   mounting an optical device on an adjustable plate, the adjustable plate having a first flexure having a first modulus of elasticity on a first side of the adjustable plate and having a second flexure on a second side opposite the first side of the adjustable plate, wherein the second flexure has a second modulus of elasticity and the second flexure impinges the second lip of the fixed plate;
   mounting an adjustment mechanism between the first lip of the fixed plate and the first flexure; and
   positioning the optical device using the adjustment mechanism such that the adjustable plate moves less than the adjustment mechanism.

16. The method of claim 15, wherein the first flexure and the second flexure are leaf springs.

17. The method of claim 15, wherein the mounting the fixed plate comprises placing the fixed plate on posts mounted to the optical device, applying ultraviolet (UV) curable adhesive to the posts and to washers, placing the washers on the posts and on the fixed plate, and curing the UV curable adhesive.

18. The method of claim 15, wherein the adjustment mechanism is a screw.

19. The method of claim 15, wherein the second modulus of elasticity is greater than the first modulus of elasticity.

20. The method of claim 19, wherein the second modulus of elasticity is twenty times greater than the first modulus of elasticity.

* * * * *